May 21, 1968  A. FENER  3,384,527
MEANS FOR SPLICING THERMOPLASTIC WEBBING
Filed Feb. 12, 1965

INVENTOR,
Alfred Fener,
BY
ATTORNEY.

United States Patent Office 3,384,527
Patented May 21, 1968

3,384,527
MEANS FOR SPLICING THERMOPLASTIC WEBBING
Alfred Fener, 422 Beach 146th St., Neponsit, N.Y. 10013
Filed Feb. 12, 1965, Ser. No. 432,242
10 Claims. (Cl. 156—502)

ABSTRACT OF THE DISCLOSURE

Web ends, superimposed with corresponding surfaces in contact, are joined by a heat sealing operation which trims off excess material. The contacting surfaces are then separated and the narrow seam is subjected to heat and pressure whereby the material of the seam is fused and flattened to assume the thickness of the web body. The operations are performed by two spaced electrical heat sealing devices of the thermal impulse type, one doing the seaming and trimming, and the other, fusing and flattening the seam, whereby the web ends are joined so their juncture is homogeneous with the spliced webbings.

---

The present invention relates to a method and means for splicing thermoplastic web material. Such splicer may be a separate unit, or as herein illustrated, it may be one that is interposed in a machine working on runs of such material.

The principal object of this invention is to provide novel and improved method and means by which thermoplastic film ends are joined so their juncture is homogeneous with the spliced webbings.

Another object thereof is to provide novel and improved splicing apparatus for the practice of the method herein, which is simple in construction, reasonable in cost, easy to manipulate and efficient in carrying out the purposes for which it is designed.

Other objects and advantages will become apparent as this disclosure proceeds.

For the practice of the method taught herein, the film ends to be joined are superposed with corresponding surfaces in contact and then joined by a heat sealing operation which preferably trims off excess material. Then the contacting surfaces are separated and the seam is subjected to heat and pressure whereby the material constituting the seam is fused and flattened to assume the thickness of the web body.

Apparatus for the practice of this invention preferably comprises two spaced heat sealing devices of the thermal impulse type, each having a sealing bar and a pressure bar mounted for cooperation with each other and reciprocating means therefor. Switching means operable in timed relation with respect to the respective reciprocating means, are adapted to pass a pulse of current through the heating elements of the sealing bars, so layers of thermoplastic film interposed between the bars of any of said devices, are acted on. The heating element of one of said devices is a sealing and severing wire. The heating element of the other of said devices is a tape. Said devices are positioned so that the bars thereof are parallel. I find it most practical to have the sealing bars stationary and the pressure bars movable.

In the accompanying drawing forming part of this specification, similar characters of reference indicate corresponding parts in all the views.

Figure 1:
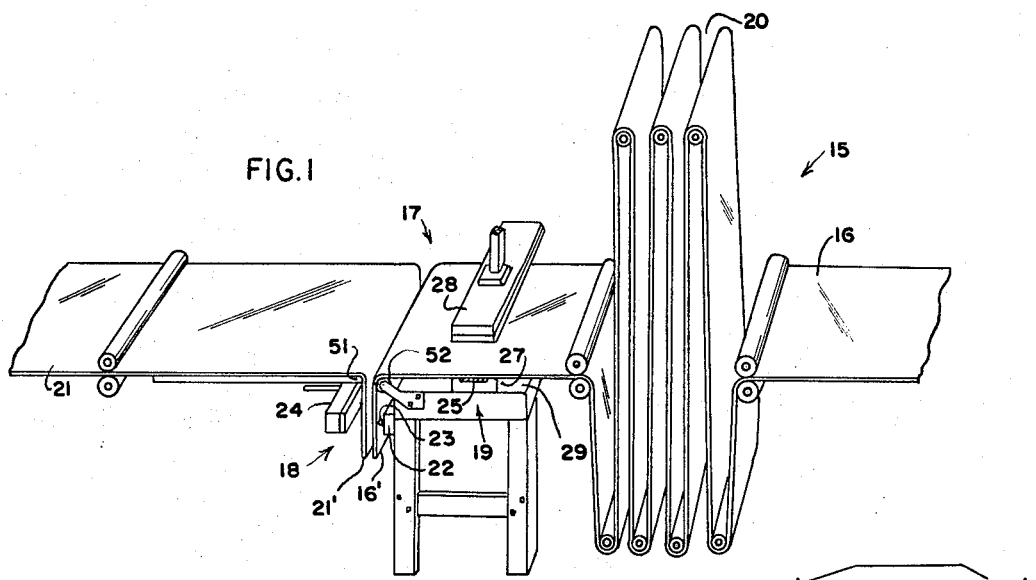
FIG. 1 is a fragmentary, diagrammatic, partly in section, perspective view showing a splicer apparatus embodying teachings of this invention, as part of a machine working on a thermoplastic web running therethrough.

In the drawing, the numeral 15 designates generally a machine which works on a thermoplastic web 16 running through it. The numeral 17 denotes generally a splicing station whose equipment consists of the thermal impulse electrically-operated heat sealing devices indicated generally by the numerals 18 and 19, interposed between the web supply roll (not shown) and preferably an accumulated supply 20 of the web material, so the machine can continue running while a splice is being made to join the tail end 16' of the web being worked on, with the lead end 21' of a new supply 21.

The heat sealing device 18 comprises a sealing bar 22 having the heating and trimming wire 23 therealong, and a pressure bar 24 opposite said sealing bar, normally spaced therefrom and mounted for movement towards and away from said sealing bar. The heat sealing device 19 comprises a sealing bar 27 having a heating tape 25 therealong, and a pressure bar 28 opposite thereto normally spaced therefrom and mounted for movement towards and away from said sealing bar 27. All said bars are parallel and positioned across the web run.

In the particular embodiment illustrated, the sealing bar 27 is fixed on a table top 29, with the pressure bar 28 positioned above it. The table end first reached by the web as it runs through the machine, has the sealing bar 22 fixed thereon below table top, with the pressure bar 24 in front of it. The pressure bar 28 moves along the vertical. The pressure bar 24 moves along the horizontal. The web 16 being worked on by the machine 15, is between the bars 27 and 28.

Figure 5:
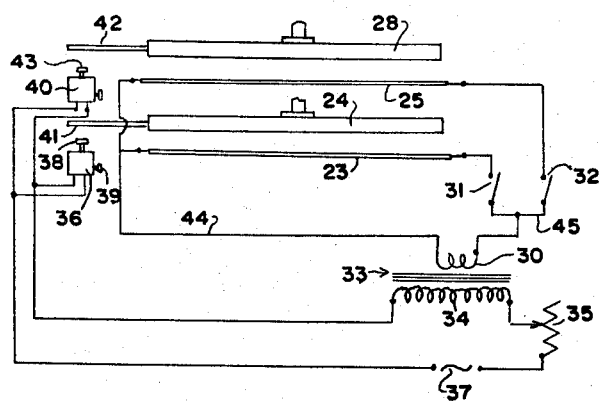
FIG. 5 is a diagrammatic view showing the heater elements of the heat sealing devices, the electrical circuit therefor and the means for controlling and operating said circuit.

Details of structure for these heat sealing devices are well known and further information may be gotten from such patents as No. 2,796,913 to Fener and Langer, and in Patents Nos. 2,460,460 and 2,961,031 to Fener. However, in FIG. 5 herein, I have shown an operating circuit to selectively actuate the heating elements 23 and 25, upon manual operation of the single-pole, single-throw switches 32 and 31 respectively. The numeral 30 denotes the secondary winding of a step-down transformer 33. The primary winding 34 of said transformer, in series with an adjustable rheostat 35 and a time delay switch 36, are connected as a group across the terminals of a source of alternating current 37. This time delay switch is of the type which closes an electric circuit upon its actuating plunger 38 being depressed and automatically open said circuit, a predetermined time delay period thereafter; the length of such time delay being adjustable by means of the adjusting screw 39. This switch means is well known in the art, so no further showing or description thereof is necessary. A similar time delay switch means 40, is connected in parallel with the switch means 36. Extending arms 41 and 42 are provided on the pressure bars 24 and 28, to move the plungers 38 and 43 of said timing switches when the respective sealing devices are operated. One of the terminals of each of the heating elements 23, 25 are connected by a conductor 44 to one of the terminals of the secondary winding 32. The other terminal of said secondary winding is connected by a conductor 45 to one of the terminals of each of the switches 31 and 32. The second terminal of the switch 32 is connected to the other terminal of the heating element 25. The second terminal of the switch 31 is connected to the other terminal of the heating element 23.

Figure 2:
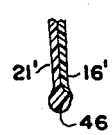
FIGS. 2–4 show the successive steps for making a splice in accordance with this invention.
Figures 3, 4:
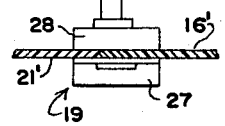

To splice a new web 21 to the web 16, their end portions are brought down to lie between the bars 22 and 24. It is to be noted that corresponding surfaces of the tail end region 16' of the web 16, and the lead end region 21' of the web 21, id est, the upper surfaces of said webs, face each other. Now closing the switch 31 and having the switch 32 open, such regions become superposed by moving the pressure bar 24 to the sealing bar 22, whereupon arm 41 will depress the plunger 38, thereby causing the actuation of the heating element 23, which will seal and trim said layers 16', 21' as shown in FIG. 2, whereby a bulbous or bead seam 46 is formed; the diameter of the wire 23 being greater than the combined thicknesses of the thermoplastic film layers; the apparatus 18 being preferably of the type shown in Patent No. 2,961,031. Now, upon moving the pressure bar 24 away, then pulling the web upward and spreading it and thereafter setting the web as shown in FIG. 3 so that the bead seam 46 lies atop, along and within the confines of the relatively broad heating element 25, and then the pressure bar 28 brought down, will cause the switch 40 to be set into action; the switch 31 being opened and the switch 32 closed, for this phase. The heat and pressure applied to the seam 46 by the device 19, will cause said seam to fuse and become flattened to web thickness, and so in the splice, eveness with web thickness will be accomplished as seen in FIG. 4. The switches 31 and 32, when of the normally-open type, may be on the respective handles on the pressure bars, so that when the operator grasps a handle to move a pressure bar, the related switch 31 or 32 as the came may be, is held closed. Such mounting of said switches on the handles, though not shown, is believed readily understood by those versed in the machine arts, and needs no further illustration. Any other type of narrow seam effected by the device 18, will be worked equally well by the device 19, to effect evenness at the splice.

Figure 6:
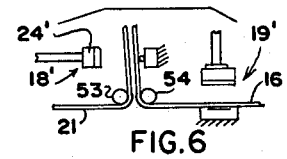
FIGS. 6 and 7 show different arrangements of the heat sealing devices, diagrammatically.
Figure 7:
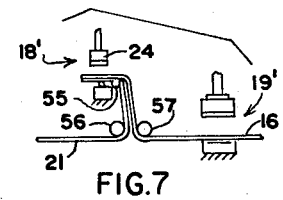

Instead of bringing the web end region downard as in FIG. 1 to the trimming and seaming device 18, the set up may be for them to be brought upward as shown in FIG. 6, where the seaming-trimming device 18' is above table top and its pressure bar 24' moves horizontally, or the arrangement may be as shown in FIG. 7 where the sealing-trimming device 18" is above table top and its presure bar 24" moves along the vertical.

Figure 8:
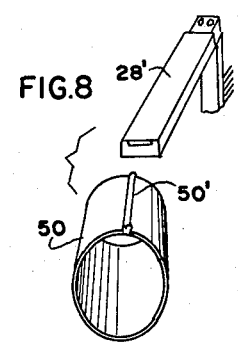
FIG. 8 is a diagrammatic showing of the final step to seam a pair of opposite edges of a sheet to form it into a tube by the splicing method taught herein. This view is drawn in perspective.

Should it be desired to join two opposite ends of a sheet to form a tube-form and effect evenness of web thickness at the seam 50', the inner surfaces of each end region are superposed for insertion into and action by the seaming-trimming device, but the pressure bar 28' of the seam-flattening device 19', shall be a cantilever beam, so the tube 50 can be set thereon as shown in FIG. 8.

Although I have shown webs to be joined traveling along the horizontal in a horizontal plane, the splicing station 17 may be set at any angle to suit particular installations where web direction is along the vertical or slanted, which will be readily understood without further illustration.

It should be noted that in all instances for the practice of this invention, corresponding surfaces of the end regions to be joined, are superposed for action by the seaming-trimming operation and then spread apart for action by the flattening device where fusion of the seam body occurs. In FIGS. 6 and 7, the lower surface, meaning the bottom surfaces of the web ends are in contact at the seaming-trimming device. Wherever convenient, guide members as 51–57 are employed to help position the web ends.

This invention is capable of numerous forms and various applications, and the splicing station 17 may be separate and apart from any other apparatus, without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific showings and description herein, to indicate the scope of this invention.

I claim:

1. In an apparatus for splicing two ends of thermoplastic film material, the combination of a frame, a first and a second heat sealing means of the thermal impulse type; each of said sealing means having sealing and pressure bars positioned opposite each other and mounted on said frame for relative movement towards and away from each other; the sealing bar of the first heat sealing means including an elongated heater element facing its associated pressure bar, adapted to be heated by passing a pulse of current therethrough, means for relatively moving the bars of the first heat sealing means to apply pressure across layers of thermoplastic web material interposed between them and means for severing said films adjacent and along the seam made by said heater element, leaving the seam intact; the sealing bar of the second heat sealing means including an elongated heater tape element facing its associated pressure bar, adapted to be heated by passing a pulse of current therethrough, means for relatively moving the bars of the second heat sealing means to apply pressure to and along a seam made by the first heat sealing means, when said seam is positioned between the bars of the second heat sealing means; all of said bars being positioned so that when web material is positioned between the bars of the first heat sealing means and seamed, said web is shiftable lengthwise for the seam to come between the bars of the second heat sealing means.

2. An apparatus as defined in claim 1, including guide means on said frame to lead said end regions so corresponding surfaces thereof face each other between the bars of the first heat sealing means while another region of the web material is between the bars of the second heat sealing means.

3. An apparatus as defined in claim 1, wherein all of said bars are in parallel relation.

4. An apparatus as defined in claim 1, wherein the sealing bars are fixed on the frame.

5. An apparatus as defined in claim 1, wherein all of said bars are in parallel relation; the relative movement of the bars of the first heat sealing means being along the horizontal and the relative movement of the bars of the second heat sealing means being along the vertical.

6. An apparatus as defined in claim 5, wherein the sealing bars are fixed on the frame; the bars of the first heat sealing means being below the general plane of the sealing bar of the second heat sealing means.

7. An apparatus as defined in claim 5, wherein the sealing bars are fixed on the frame; the bars of the first heat sealing means being above the general plane of the sealing bar of the second heat sealing means.

8. An apparatus as defined in claim 1, wherein all of said bars are in parallel relation; the relative movement of the bars of the respective heat sealing means being along the same line of direction.

9. An apparatus as defined in claim 1, wherein one of the bars of the second heat sealing means is a cantilever.

10. An apparatus as defined in claim 1, including switching means for selectively passing a pulse of current through said heater elements.

References Cited

UNITED STATES PATENTS

| | | | |
|---|---|---|---|
| 2,711,779 | 6/1955 | Carland | 156—515 |
| 2,711,780 | 6/1955 | Hakomaki | 156—304 |
| 2,767,941 | 10/1956 | Gegner et al. | 156—251 |

DOUGLAS J. DRUMMOND, *Primary Examiner.*